United States Patent [19]
Amundson, Jr.

[11] Patent Number: 5,681,782
[45] Date of Patent: Oct. 28, 1997

[54] LIGHT PINK GLASSWARE

[75] Inventor: W. Duane Amundson, Jr., Corning, N.Y.

[73] Assignee: Corning Incorporated, Corning, N.Y.

[21] Appl. No.: 775,916

[22] Filed: Jan. 2, 1997

Related U.S. Application Data

[60] Provisional application No. 60/012,418, Feb. 26, 1996.

[51] Int. Cl.[6] .................................................. C03C 3/087
[52] U.S. Cl. ........................... 501/71; 501/70; 501/64
[58] Field of Search ........................... 501/64, 70, 71

[56] References Cited

U.S. PATENT DOCUMENTS

| | | | |
|---|---|---|---|
| 2,229,416 | 1/1941 | Lyle | 501/27 |
| 3,143,683 | 8/1964 | Duncan et al. | 313/110 |
| 3,723,142 | 3/1973 | Kato et al. | 501/71 |
| 4,235,634 | 11/1980 | Boyd et al. | 501/70 |
| 4,866,010 | 9/1989 | Boulos et al. | 501/71 |
| 4,873,206 | 10/1989 | Jones | 501/71 |
| 5,030,593 | 7/1991 | Heithoff | 501/72 |
| 5,070,043 | 12/1991 | Amundson, Jr. et al. | 501/3 |
| 5,204,293 | 4/1993 | Amundson, Jr. et al. | 501/72 |
| 5,436,206 | 7/1995 | Amundson, Jr. | 501/71 |
| 5,478,783 | 12/1995 | Higby et al. | 501/27 |

FOREIGN PATENT DOCUMENTS 0 463 606 B1   3/1994   European Pat. Off.

Primary Examiner—Mark L. Bell
Assistant Examiner—Louis M. Troilo
Attorney, Agent, or Firm—Milton M. Peterson

[57] ABSTRACT

A transparent glass exhibiting a light pink color, the glass, as analyzed, consisting essentially of 12–34 ppm selenium in conjunction with a co-colorant selected from a group consisting of 1.5–7 ppm cobalt oxide calculated as $Co_3O_4$ and 500–700 ppm neodymium oxide in a soda lime silicate base glass that contains as impurities no more than about 700 ppm $MnO_2$ and 500 ppm $Fe_2O_3$.

16 Claims, 1 Drawing Sheet

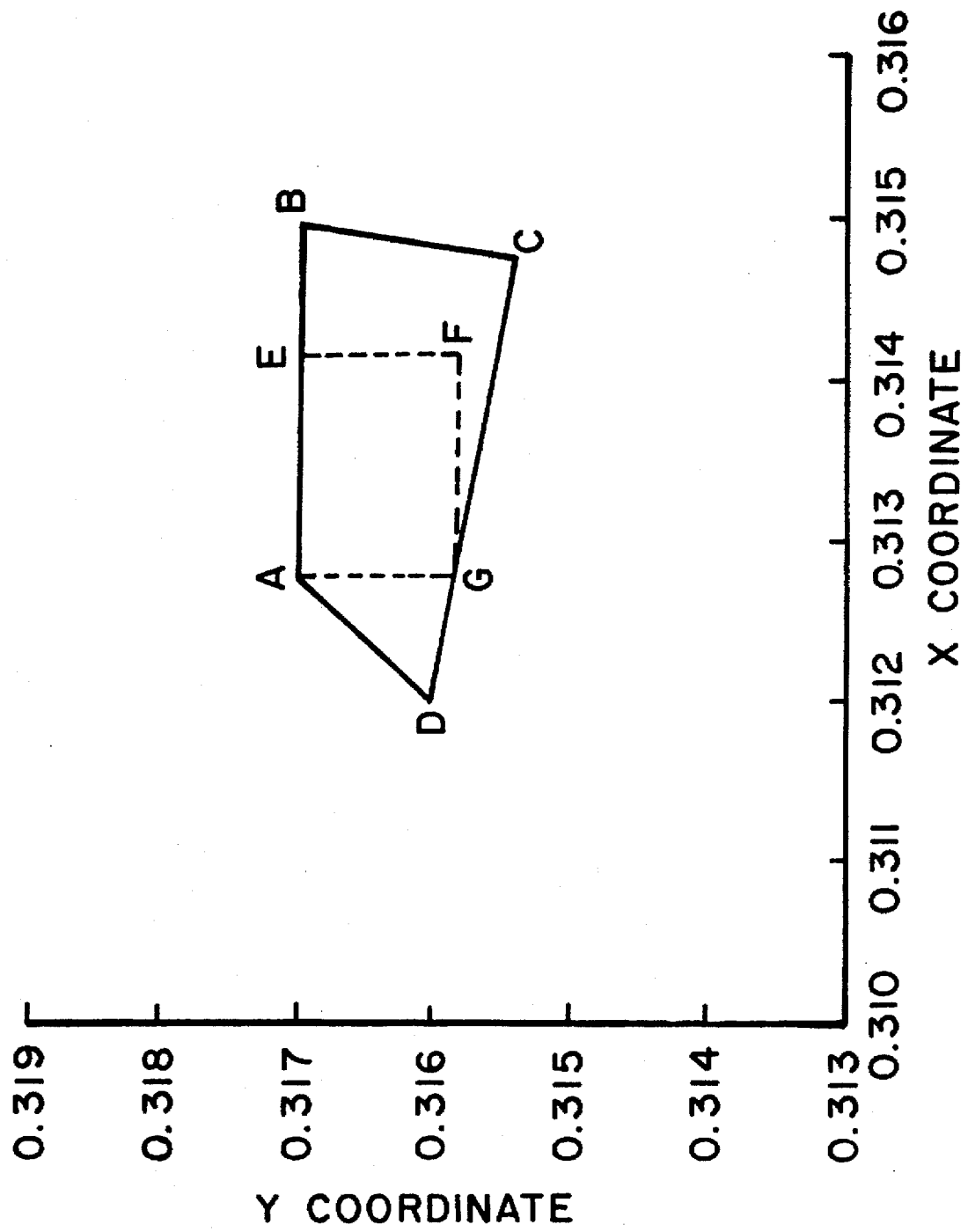

LIGHT PINK GLASSWARE

This application claims the benefit of U.S. Provisional application Ser. No. 60/012,418 filed Feb. 28, 1996, entitled LIGHT PINK GLASSWARE, by W. Duane Amundson, Jr.

FIELD OF THE INVENTION

Transparent, colored glasses having a soda lime silicate base, and glassware produced therefrom.

BACKGROUND OF THE INVENTION

Glass ovenware was introduced commercially about 1915 under the trademark PYREX. This glassware was clear, water white, and molded from a borosilicate glass.

Subsequently, use of glassware became wide spread for the preparation and serving of food. As this occurred, a desire for glassware having color developed.

One method of meeting this need was with opal ware. This glassware is rendered opaque by development of light scattering particles dispersed in the glass. Opal ware was used as such, was colored by colorants added to the glass batch, or was given a colored coating, for example, an enamel applied to the surface of the ware. The latter procedure was of particular interest because it permitted either solid color or patterns.

The development of opal ware led to a need for increased mechanical strength as well as heat resistance. It was found that this need could be met by tempering the opal ware. Tempering is a procedure of glass treatment in which the surface of a glass article is placed in compression, thereby increasing the force necessary to induce fracture. Numerous methods have been described and used to temper glass articles. These include thermal treatment by chilling from an elevated temperature, and chemical treatment by ion exchange.

The tempering treatment can also be employed to strengthen, and render thermally resistant, transparent glassware, either plain or colored, produced with a soda lime silicate base glass. This glass base has a significantly less expensive batch, and is easier to melt than the borosilicate glasses originally employed.

U.S. Pat. No. 5,204,293 (Amundson, Jr. et al.) describes a family of transparent, soda lime silicate glasses having a burgundy color. The glass compositions consist essentially of 0.3–2.2 percent by weight manganese oxide in a soda lime silicate base glass. The glass has impurity levels for NiO and $Fe_2O_3$ not exceeding 100 parts per million (ppm) and 500 ppm, respectively.

The present invention arose in the course of developing a set of transparent, solid-color bowls having such light colors as to be termed blush colors. The color intensity is so low that the color is barely visible in a thin wall section. The color becomes more like a highlight being visible in thicker rim and foot areas, as well as through an edge. The invention is concerned directly with a member of the set having a light pink color.

A primary purpose of the invention then is to provide a transparent, soda lime silicate glass embodying an acceptable light pink color and a bowl molded therefrom. Another purpose is to provide a complete line of such glassware for use in preparation and serving of food. A further purpose is to provide such glassware that can be strengthened and rendered heat resistant by tempering. Another purpose is to provide a combination of colorants that can be melted as part of a glass batch, or can be incorporated in an uncolored base glass by a color cell procedure. Such a procedure involves adding colorant to a glass as the molten glass passes through a forehearth.

SUMMARY OF THE INVENTION

The invention resides in part in a transparent glass exhibiting a light pink color and having a composition, as analyzed, consisting essentially of 12–34 ppm selenium in conjunction with a co-colorant selected from a group consisting of 1.5–7 ppm cobalt oxide, calculated as $Co_3O_4$, and 500–700 ppm neodymium oxide in a soda lime silicate base glass, the glass containing as impurities no more than about 700 ppm $MnO_2$ and 500 ppm $Fe_2O_3$.

The invention further resides in a tempered glass article that is useful in the preparation and serving of food, and that is molded from the glass just described.

BRIEF DESCRIPTION OF THE DRAWINGS

The single FIGURE in the accompanying drawing is a graphical representation of the invention in terms of x and y color coordinates.

PRIOR ART

Literature of possible relevance is set forth in an accompanying document.

DESCRIPTION OF THE INVENTION

A key feature of the present invention resides in discovery of certain glass colorant combinations. These colorant combinations provide a relatively specific, light pink color in a soda lime silicate base glass.

The term "soda lime silicate glass" is generally understood in the glass art to mean glasses having compositions consisting essentially of 70–75% $SiO_2$, 5–15% $Na_2O$ and 5–15% CaO. Minor amounts of other oxides may optionally be present, such as alumina as a stabilizer and antimony as a fining agent.

The single FIGURE in the accompanying drawing is a graphical representation defining, in terms of x and y color coordinates, the color feature of the invention. The color coordinates refer to, and are based on, Illuminant C in accordance with the CIE color coordinate system. The x coordinates are plotted on the horizontal axis. The y coordinates are plotted on the vertical axis.

The rectangle ABCDA encompasses coordinate values that represent the area within which a pink color can be obtained that is suitable for present purposes. x and y coordinate values for the points A, B, C and D are as follows:

|   | x | y |
|---|---|---|
| A | 0.3128 | 0.3170 |
| B | 0.3150 | 0.3170 |
| C | 0.3148 | 0.3154 |
| D | 0.3120 | 0.3160 |

A smaller area was established as a target, or preferred, area, for introduction of colorant by a color cell procedure. This preferred area is designated as AEFG in the drawing and has color coordinates as follows:

x=0.3128–0.3142 y=0.3170–0.3158

CAP Y=85.5–88.1

The desired pink color may be obtained by two different, though related, colorant combinations. Both employ 12–34 ppm selenium. In one combination, the selenium is combined with 1.5-7 ppm cobalt oxide. In the other, it is combined with 500-700 ppm neodymium oxide. While both combinations are effective for the purpose, the first combination is preferred because of its lower cost. Selenium alone tends to produce an orange color, the intensity depending on the mount present.

The light pink color of the invention may be obtained in a reasonably pure form with either colorant combination. However, care must be taken to observe the indicated composition limits. Thus, an excess of cobalt oxide tends to push the color toward a blue that is too intense. Likewise, too much selenium tends to produce an orange cast in the glass article.

Care must also be taken to either avoid, or carefully limit, the presence of other colorants that may produce either an off-color or a grayish tint. In order to use cullet from a glass containing manganese oxide, it has been found that this oxide may be tolerated in amounts up to about 500 ppm. However, it is preferred to keep the content 30 below 400 ppm since larger amounts tend to have an undesirable effect on the color. Chrome ($Cr_2O_3$) and molybdenum oxide ($MoO_3$) should each be kept below about 10 ppm, while nickel oxide (NiO) should be kept below about 30 ppm, to avoid undesirable color effects.

Iron oxide is almost inevitably present as an impurity. A small mount, for example on the order of 250 ppm, is useful for heat retention in the glass melt during the melting operation. However, this oxide should not exceed 500 ppm, and preferably is maintained under 400 ppm.

SPECIFIC EMBODIMENTS

A commercially melted, water white, soda lime silicate glass was selected as a base glass for development purposes. A typical analysis of this glass, in approximate weight percent, is:

| | | | |
|---|---|---|---|
| $SiO_2$ | 75.5 | CaO | 9.5 |
| $Na_2O$ | 12.9 | $Al_2O_3$ | 1.7 |
| $K_2O$ | 0.4 | $Sb_2O_3$ | 0.02 |
| $Li_2O$ | 0.02 | $Fe_2O_3$ | 290 ppm |

Antimony oxide functions as a fining agent and alumina as a stabilizer. $K_2O$, $Li_2O$ and $Fe_2O_3$ are present only because they occur in soda and silica raw materials.

Batches were prepared based on this commercial glass composition. Various mounts of colorants were added to the batches to provide a range of glass colon for establishing color feasibility and color selection. Melts were made in silica crucibles in a gas-fired furnace that was held at 1500° C for 4 hours. The melts were poured in molds to form patties for test purposes.

Analyses showed that only about 15% of the selenium added to a batch was retained during melting. For example, with 180 ppm added to the batch, the glass analysis showed only 27 ppm. The loss of $Nd_2O_3$ was about 17% so that an analysis showed 750 ppm retained from a 900 ppm addition to the batch. Cobalt oxide did not undergo appreciable loss.

It is apparent that both colorant retention and the color obtained will be dependent on furnace conditions. Thus, the amount of colorant required may depend on whether it is included in a batch that is tank melted, or whether it is added by the color cell procedure. Also, the oxidation state of a glass, which is influenced by the atmosphere, may affect the state of the colorant as well as the amount. In general, reducing conditions may be detrimental to certain furnace components. Accordingly, we prefer to maintain neutral or mildly oxidizing conditions. A strongly oxidizing atmosphere may require larger amounts of colorant to achieve a given color.

TABLE I sets forth in parts per million (ppm) the colorant amounts hatched in several melts, together with the color coordinates measured on samples of the batch melts. The colorants added were selenium alone, or in combination with neodymium or cobalt oxide. The color coordinates were measured in terms of the CIE system.

TABLE I

| Ex. | Se (ppm) | $Co_3O_4$ (ppm) | $Nd_2O_3$ (ppm) | $MnO_2$ (ppm) | x | y | Cap Y |
|---|---|---|---|---|---|---|---|
| 1 | 137 | 2 | — | 350 | 0.3139 | 0.3173 | 88.19 |
| 2 | 137 | 4 | — | 350 | 0.3141 | 0.3168 | 87.15 |
| 3 | 137 | 2 | — | 700 | 0.3144 | 0.3173 | 87.77 |
| 4 | 137 | 4 | — | 700 | 0.3137 | 0.3169 | 87.13 |
| 5 | 180 | 2 | — | 700 | 0.3153 | 0.3179 | 86.30 |
| 6 | 180 | 4 | — | 700 | 0.3138 | 0.3165 | 87.47 |
| 7 | 137 | 5 | — | — | 0.3129 | 0.3162 | 87.50 |
| 8 | 137 | 10 | — | — | 0.3122 | 0.3150 | 85.85 |
| 9 | 137 | 0 | — | — | 0.3150 | 0.3176 | 88.20 |
| 10 | 137 | — | 500 | — | 0.3139 | 0.3164 | 87.60 |
| 11 | 137 | — | 900 | — | 0.3133 | 0.3161 | 87.46 |
| 12 | 180 | — | 500 | — | 0.3132 | 0.3164 | 88.03 |
| 13 | 180 | — | 900 | — | 0.3126 | 0.3155 | 87.13 |
| 14 | 137 | — | 700 | 350 | 0.3128 | 0.3161 | 87.41 |
| 15 | 180 | — | 700 | 700 | 0.3124 | 0.3161 | 87.58 |

Subsequently, with these crucible melts as a guide, a trial run was carried out on glass from a commercial unit melting the water white base glass. Colorant was added in increasing amounts to the glass in a forehearth via a color cell system. In this procedure, a granulated, sintered color concentrate was added to the glass melt in the forehearth. Samples were taken periodically and 4 mm thick test pieces were prepared for measurement of x and y coordinates as well as colorant contents.

On the basis of the color samples thus produced, a set of limits for preferred analyzed colorant content and x, y and CAP Y coordinates was established. These were:

TABLE II

| | Se(ppm) | | | | | |
|---|---|---|---|---|---|---|
| | Chem. | XRF | $Co_3O_4$ (ppm) | x | y | Cap Y |
| Light | 13 | 12 | <2 | 0.3128 | 0.3170 | 88.1 |
| Preferred | 21 | 21 | 3 | 0.3138 | 0.3166 | 86.9 |
| Dark | 31 | 34 | 3 | 0.3142 | 0.3158 | 85.5 |

I claim:

1. A transparent glass exhibiting a light pink color defined by color coordinates falling within the polygon ABCDA in the accompanying drawing, the glass, as analyzed, consisting essentially of 12-34 ppm selenium in conjunction with a co-colorant selected from a group consisting of 1.5-7 ppm cobalt oxide calculated as $Co_3O_4$ and 500-700 ppm neodymium oxide in a soda lime silicate base glass that contains as impurities no more than about 700 ppm $MnO_2$ and 500 ppm $Fe_2O_3$.

2. A glass in accordance with claim 1 exhibiting chromaticity coordinates falling within the ranges:
x=0.3128-0.3142
y=0.3170-0.3158
CAP Y=88.1-85.5.

3. A glass in accordance with claim 1 wherein the selected co-colorant is 15-7 ppm cobalt oxide.

4. A glass in accordance with claim 1 wherein the selected co-colorant is 500–700 ppm neodymium oxide.

5. A glass in accordance with claim 1 consisting essentially of about 21 ppm selenium and about 3 ppm cobalt oxide.

6. A glass in accordance with claim 1 containing about 21 ppm selenium and about 550 ppm neodymium oxide.

7. A glass in accordance with claim 1 containing 250–500 ppm $Fe_2O_3$.

8. A glass in accordance with claim 1 consisting of 75.5% $SiO_2$, 12.9% $Na_2O$, 9.5% CaO, 1.7% $Al_2O_3$, 0.4% $K_2O$, 0.02% $Li_2O$, 0.02% $Sb_2O_3$, 0.029% $Fe_2O_3$, 3ppm $Co_3O_4$, and 21 ppm Se.

9. A transparent, tempered glass article exhibiting a light pink color defined by color coordinates falling within the polygon ABCDA in the accompanying drawing, the glass, as analyzed, consisting essentially of 12–34 ppm selenium in conjunction with a co-colorant selected from a group consisting of 1.5–7 ppm cobalt oxide calculated as $Co_3O_4$ and 500–700 ppm neodymium oxide in a soda lime silicate base glass that contains as impurities no more than about 700 ppm $MnO_2$ and 500 ppm $Fe_2O_3$.

10. A glass article in accordance with claim 9 exhibiting chromaticity coordinates falling within the ranges:

x=0.3128–0.3142 y=0.3170–0.3158

CAP Y=88.1–85.5

11. A glass article in accordance with claim 9 wherein the selected co-colorant is 1.5–7 ppm cobalt oxide.

12. A glass article in accordance with claim 9 wherein the selected co-colorant is 500–700 ppm neodymium oxide.

13. A glass article in accordance with claim 9 consisting essentially of about 21 ppm selenium and about 3 ppm cobalt oxide.

14. A glass article in accordance with claim 9 containing about 21 ppm selenium and about 550 ppm neodymium oxide.

15. A glass article in accordance with claim 9 containing 250–500 ppm $Fe_2O_3$.

16. A glass article in accordance with claim 9 consisting of 75.5% $SiO_2$, 129% $Na_2O$, 9.5% CaO, 1.7% $Al_2O_3$, 0.4% $K_2O$, 0.02% $Li_2O$, 0.02% $Sb_2O_3$, 0.029% $Fe_2O_3$, 3 ppm $Co_3O_4$, and 21 ppm Se.

* * * * *